US007961851B2

(12) United States Patent
Bran et al.

(10) Patent No.: US 7,961,851 B2
(45) Date of Patent: Jun. 14, 2011

(54) METHOD AND SYSTEM TO SELECT MESSAGES USING VOICE COMMANDS AND A TELEPHONE USER INTERFACE

(75) Inventors: Cary Arnold Bran, Seattle, WA (US); Alan D. Gatzke, Bainbridge Island, WA (US); Jim Kerr, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 1357 days.

(21) Appl. No.: 11/460,215

(22) Filed: Jul. 26, 2006

(65) Prior Publication Data

US 2008/0037716 A1    Feb. 14, 2008

(51) Int. Cl.
H04M 11/06    (2006.01)
(52) U.S. Cl. ............... 379/88.14; 701/211; 704/243; 704/251; 704/254; 704/257; 704/275
(58) Field of Classification Search ............ 379/67.1, 379/80, 88.01, 88.02, 88.23, 88.14; 340/7.2; 345/2.1; 455/566; 704/235, 255, 260, 270, 704/275, 243, 251, 254; 701/211
See application file for complete search history.

(56) References Cited

U.S. PATENT DOCUMENTS

| | | | | | |
|---|---|---|---|---|---|
| 5,434,909 | A | * | 7/1995 | Price et al. | 379/88.01 |
| 5,594,784 | A | * | 1/1997 | Velius | 379/88.02 |
| 6,088,428 | A | * | 7/2000 | Trandal et al. | 379/88.02 |
| 6,259,892 | B1 | * | 7/2001 | Helferich | 340/7.2 |
| 6,377,927 | B1 | * | 4/2002 | Loghmani et al. | 704/275 |
| 6,385,584 | B1 | * | 5/2002 | McAllister et al. | 704/275 |
| 6,490,521 | B2 | * | 12/2002 | Wiener | 701/211 |
| 6,625,261 | B2 | * | 9/2003 | Holtzberg | 379/88.23 |
| 6,651,042 | B1 | * | 11/2003 | Field et al. | 704/270 |
| 6,697,796 | B2 | * | 2/2004 | Kermani | 379/88.14 |
| 6,990,448 | B2 | * | 1/2006 | Charlesworth et al. | 704/243 |
| 6,996,531 | B2 | * | 2/2006 | Korall et al. | 704/270 |
| 7,039,585 | B2 | * | 5/2006 | Wilmot et al. | 704/235 |
| 7,401,019 | B2 | * | 7/2008 | Seide et al. | 704/254 |
| 7,426,470 | B2 | * | 9/2008 | Chu et al. | 704/503 |
| 7,725,318 | B2 | * | 5/2010 | Gavalda et al. | 704/251 |
| 7,809,568 | B2 | * | 10/2010 | Acero et al. | 704/257 |
| 2003/0069733 | A1 | * | 4/2003 | Chang | 704/275 |
| 2003/0128820 | A1 | * | 7/2003 | Hirschberg et al. | 379/88.14 |
| 2005/0049007 | A1 | * | 3/2005 | Cho | 455/566 |
| 2005/0069095 | A1 | * | 3/2005 | Fellenstein et al. | 379/88.02 |
| 2007/0081636 | A1 | * | 4/2007 | Shaffer et al. | 379/80 |
| 2007/0210983 | A1 | * | 9/2007 | Dove et al. | 345/2.1 |
| 2007/0233487 | A1 | * | 10/2007 | Cohen et al. | 704/255 |
| 2008/0037716 | A1 | * | 2/2008 | Bran et al. | 379/67.1 |
| 2010/0145703 | A1 | * | 6/2010 | Park | 704/260 |

\* cited by examiner

*Primary Examiner* — Gerald Gauthier
(74) *Attorney, Agent, or Firm* — Schwegman, Lundberg & Woessner, P.A.

(57) ABSTRACT

A system and method to selectively retrieve stored messages are disclosed. The method comprises receiving a voice command from a user, the voice command comprising at least one spoken search identifier, determining at least one stored message that corresponds to the spoken search identifier, and presenting the at least one stored message to the user. The plurality of stored messages may comprise content data for allowing messages with matching content data to be retrieved. The plurality of stored messages may also comprise caller data, for allowing messages with matching caller data to be retrieved. The stored messages may either be voice messages or text messages.

23 Claims, 6 Drawing Sheets

METHOD AND SYSTEM TO SELECT MESSAGES USING VOICE COMMANDS AND A TELEPHONE USER INTERFACE

FIELD

The present application is related to processing and retrieving stored messages, and in an example embodiment to a method and system to select messages using voice commands and a telephone user interface.

BACKGROUND

Finding a particular voice message using a telephone user interface (TUI) can be a cumbersome and trying experience for a user. The problem of finding a particular message may be aggravated when the user is making use of a unified communications (UC) solution having text to speech functionality, in which both email and voice messages may be read or played to the user via the TUI. In an attempt to alleviate some of the frustrations experienced by users, features have been introduced such as annotating the message with the caller information before playing the message, message order stack playback preferences, condensed conversations, and adding voice user interface (VUI) conversations. While these features add benefit and improve usability, users still do not have an easy and convenient way to search for a particular message using the TUI.

DETAILED DESCRIPTION

In the following description, for purposes of explanation, numerous specific details are set forth in order to provide a thorough understanding of an embodiment of the present application. It will be evident, however, to one skilled in the art that the present application may be practiced without these specific details.

Figure 1A:
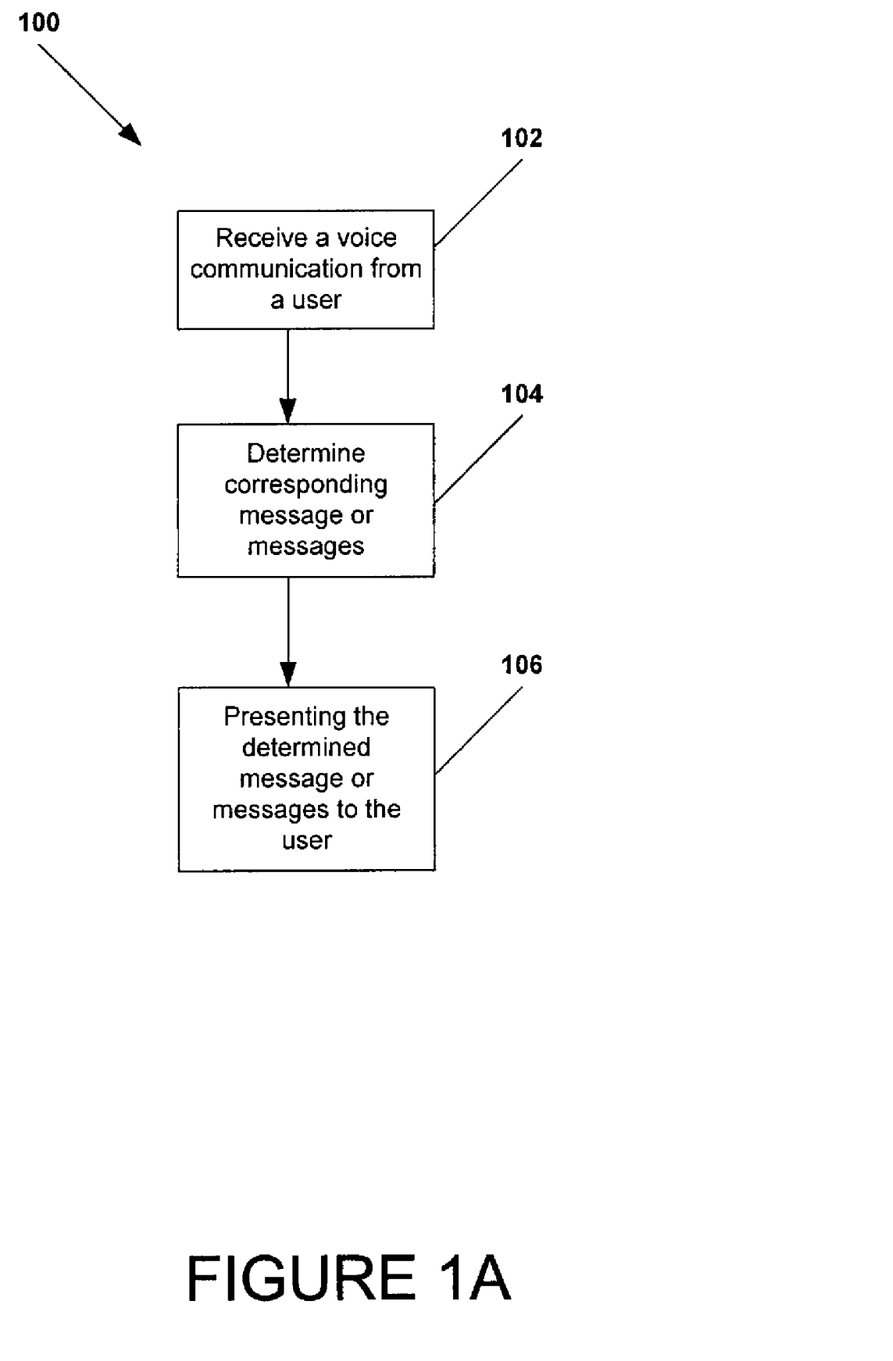
FIG. 1A shows a high level flow chart to illustrate a method, according to an example embodiment, to retrieve stored messages.

Referring to FIG. 1A, in an example embodiment of the application, a method 100 is described that allows a user to selectively retrieve at least one of a plurality of stored messages using a telephone user interface (TUI). In an example embodiment, the method 100 may comprise receiving a voice command from a user wishing to search the plurality of messages, as indicated by block 102. The voice command may comprise at least one spoken (audio domain) search identifier. The stored messages may then be examined to determine the message or messages that correspond (e.g. match) the spoken search identifier, as indicated by block 104. The determined message or messages may then be presented to the user, as indicated by block 106, for selection and retrieval.

Figure 1B:
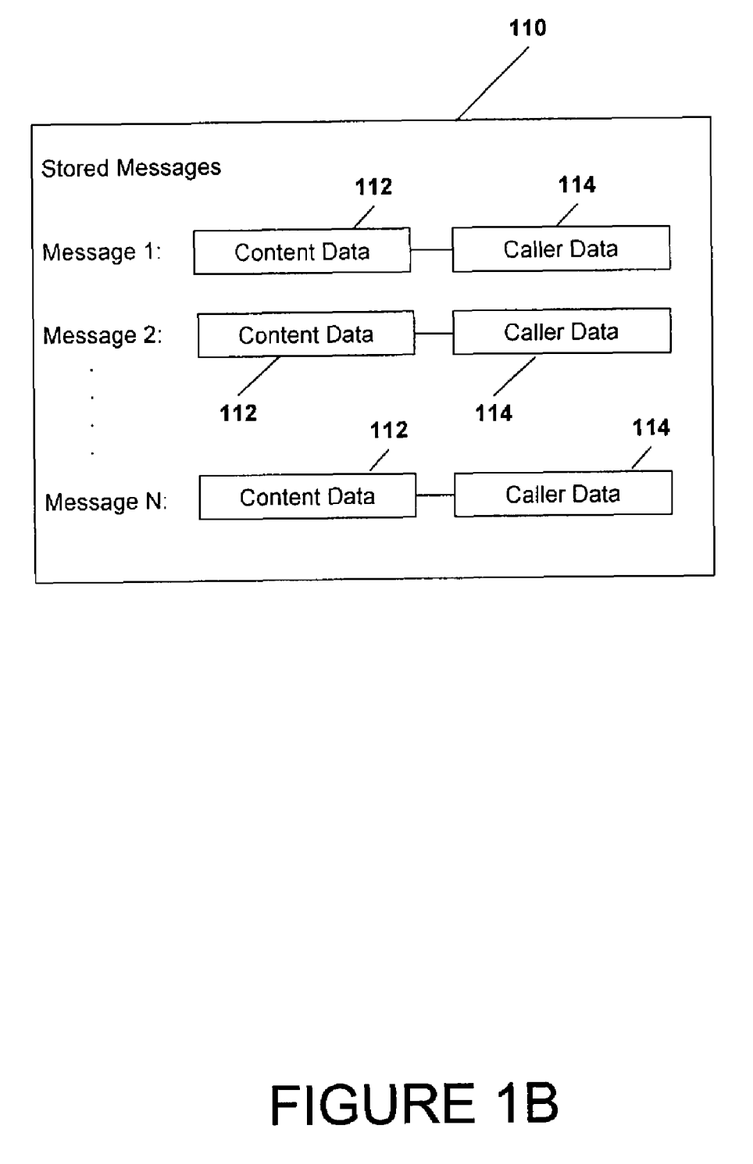
FIG. 1B shows a data structure of a stored message, according to an example embodiment.

Referring now to FIG. 1B, a data structure 110 for the stored messages shows that each of the plurality of stored messages may comprise content data 112, corresponding to the words and/or phrases used in a message left by a caller, and caller data 114, corresponding to the identity of the caller who has left the message for the user.

In an example embodiment, the spoken search identifier comprises a content identifier, with the method 100 further comprising searching the content data 112 of the stored messages utilizing the content identifier, and then determining the message or messages that include the content identifier in their content data 112.

In another example embodiment, the spoken search identifier comprises a caller identifier, with the method 100 further comprising searching the caller data 114 of the stored messages utilizing the caller identifier, and then determining the message or messages that include the caller identifier in their caller data 114.

The method 100 may thus enable the user to perform caller or content based searches. Thus, in an example embodiment, the voice command includes a command to search for messages from a particular caller, with the spoken search identifier including the identity of the particular caller. In an example embodiment, the voice command includes a command to search for messages that include a particular word or phrase in the content of the message, with the spoken search identifier including the relevant word or phrase. In a further embodiment, the voice command may include a command to search for messages from a particular caller and including a particular word or phrase, so that the voice command includes a plurality of spoken search identifiers.

In an example embodiment, the stored message may be a voice message. In this embodiment, the method may further comprise transcribing the stored voice message and the spoken search identifier to text, using speech recognition technology. The method may then compare the transcribed voice message to the transcribed spoken search identifier to determine the message or messages that match the spoken search identifier.

In an example embodiment in which the stored message may be a voice message, the method comprises comparing the stored voice message to the spoken search identifier to determine the message or messages that match the spoken search identifier. Thus, in this embodiment, a comparison in the audio domain may also be made, so that a voice message in the audio domain can be interrogated by a user voice command, also in the audio domain.

In an example embodiment, the stored message is a text message which may, for example, be sourced from an email message. In this embodiment, the method 100 may further comprise transcribing the spoken search identifier and then comparing the stored text message to the transcribed spoken search identifier to determine the message or messages that include the spoken search identifier.

In an example embodiment in which the stored message maybe a text message, the method 100 comprises converting the stored text message to an audio string, and then comparing the converted stored text message to the spoken search identifier to determine the message or messages that include the spoken search identifier. Thus, in an example application, the user may receive an email message using a TUI, the email message being read to the user.

Figure 1C:
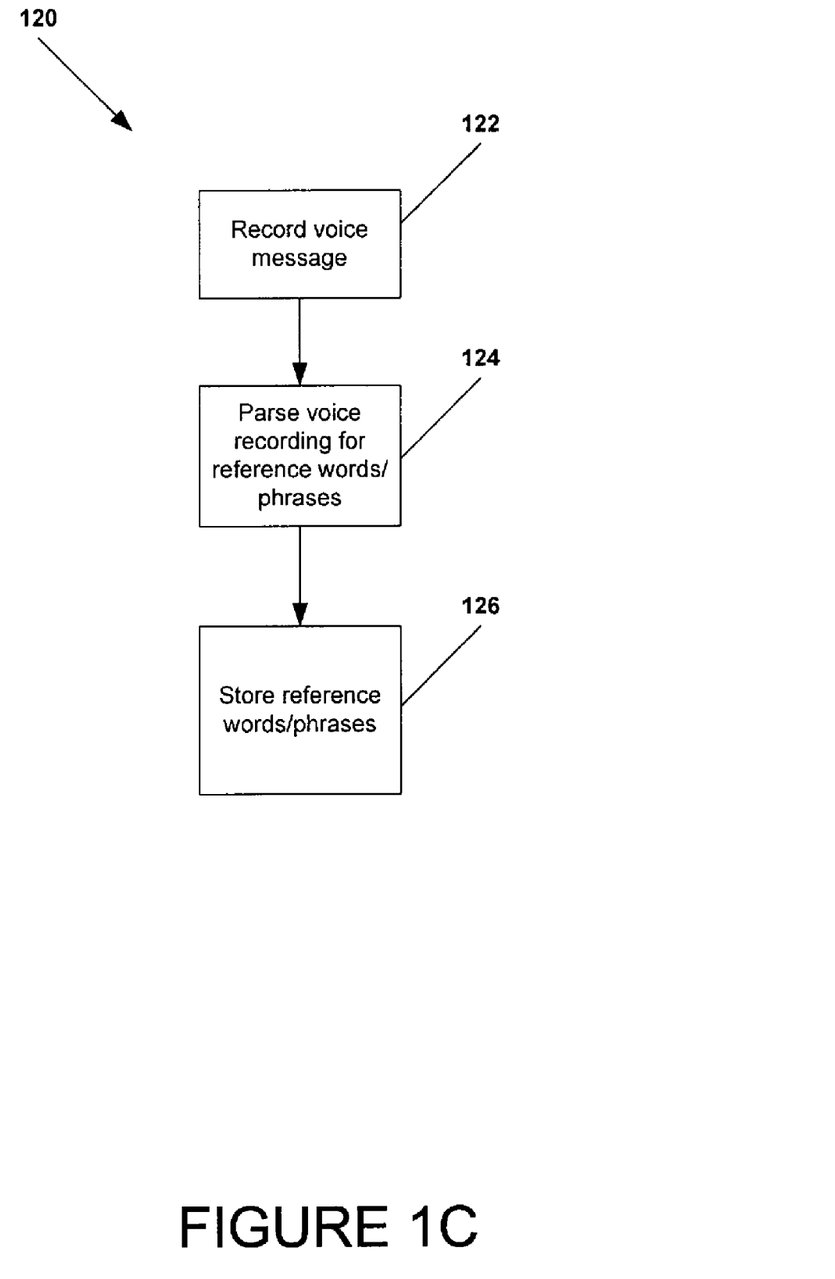
FIG. 1C shows a flow chart to illustrate a method, according to an example embodiment, to process a voice message.

In use, and with reference now to FIG. 1C, a caller may call a Unified Communications (UC) server to leave a message for the user. A method 120, according to an example embodiment, to process the user's voice message comprises recording the voice message, as indicated by block 122. The UC server may then parse the voice recording left for the user into searchable reference words or phrases, as indicated by block 124. The reference words or phrases may be associated with the caller's voice message and securely stored on the UC server, as indicated by block 126. Alternatively, the server may simply transcribe the entire voice message.

In an example embodiment, the parsing operation shown in block 124 comprises the UC server using a large vocabulary, speaker independent, speech recognition system to parse the recorded voice message. In an example embodiment, the UC server may bookmark reference words, phrases or language patterns in the recorded voice message to provide for the automated or user activated replay of those reference phrases, so as to facilitate the retrieval of the reference words or phrases. In an example embodiment, the parsing operation may include determining at least one tag to identify at least one reference portion of the recorded voice message, with each reference portion of the communication corresponding to a portion that a user may likely deem important. In an example embodiment, the play back of the reference portions may be automated or user activated such that the key portions are played either before or after the entire recorded voice message is played to the user.

Figure 1D:
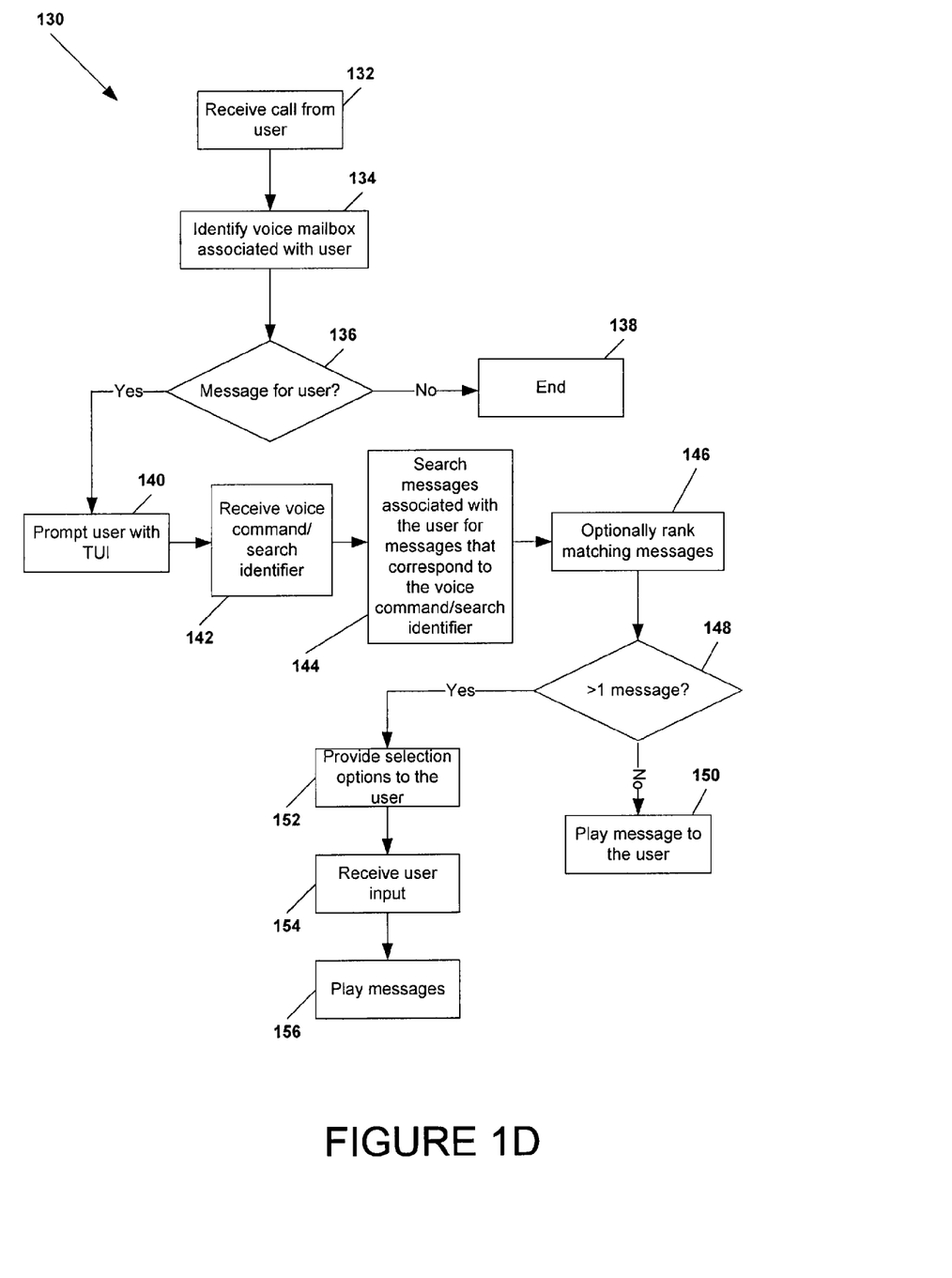
FIG. 1D shows a detailed flow chart to illustrate a method, according to an example embodiment, to retrieve stored messages.

Thereafter, the user may log into the UC server via the TUI to listen to his/her messages, as described above. With reference now to FIG. 1D, in an example embodiment, a method 130 is described that allows a user to retrieve stored messages. The method 130 may comprise receiving a call from the user, as indicated by block 132. A voice mailbox associated with the user may then be identified, as indicated by block 134. A determination may then be made as to whether the user has any messages in his or her voice mailbox, as indicated by decision block 136. If there are none, then the method 130 may end here, as indicated by block 138.

If there is a message for the user, the user may get prompted by the TUI for a voice command, as indicated by block 140. The voice command, which may comprise a spoken search identifier, may then be received from the user, as indicated by block 142. The method 130 may then search the messages associated with the user for messages that correspond to the spoken search identifier, as indicated by block 144. The method 130 may provide for the optional ranking of the matching messages, as indicated by block 146. In an example embodiment, the ranking may be based on a predefined ordering criterion (e.g. sequential or grouped by caller).

A determination may then be made as to whether the user has more than one message, as indicated by decision block 148. If there is only one message, the method 130 may comprise playing the one message to the user, as indicated by block 150. If there is more than one message, then the method 130 may comprise providing selection options to the user, as indicated by block 152. After receiving user input, as indicated by block 154, the messages may be played back to the user, as indicated by block 156.

Three scenarios in which a user may retrieve messages are described by way of example below. It will however be appreciated that the example embodiment described herein are not restricted to these three example scenarios.

Example Scenario 1—Voice Message Search

The user may search for voice messages from caller X and/or include a particular word or phrase by speaking into the TUI. For example, the user may say "Find voice messages from caller X", "Find voice messages that contain phrase Y", or "Find voice messages from caller X that contain phrase Y". The method 100 may then parse the user's voice command for the sought after phrase/s. The method 100 then attempts to match any corresponding voice message phrases from caller X, or that includes the relevant phrase Y, or that are from caller X and that include phrase Y. The method 100 then presents the user with a list of search results via a TUI. In an example embodiment, using the TUI, the user may then refine the search results or iterate through the list and choose the message that he/she would like to hear, as will be explained by way of example in more detail further on in the specification.

Scenario 2—Text Message Search

As with the example voice message searching described above, the user may search for a particular text message by speaking search words or phrases (spoken search identifier) using the TUI, the only difference in this example embodiment being that the user may specify that it is only text messages to be searched, by, for example, saying "Find text messages from caller X", or "Find text messages that contain phrase Y", or "Find text messages from caller X that contain phrase Y".

Scenario 3—Voice and Email Message Search

The user may search his/her email and voice messages for a key phrase by speaking search words or phrases utilizing the TUI. For example, the user may say "Find messages from caller X", or "Find messages that contain phrase Y", or "Find messages from caller X that contain phrase Y".

In a further example embodiment, the spoken search identifier in the voice command may be spelt out, so as to enable the user to, for example, spell out caller X's name.

The above example scenarios cover a passive TUI, in which the user's voice commands instruct a message server, via the TUI, to carry out a particular search for stored messages. In a further example embodiment, use may by made of an active TUI, in which the received voice command is received in response to voice prompts provided to the user via the TUI. Thus, in an example embodiment, the method 100 may generate and provide a voice prompt such as "If you want to search for messages from a particular caller, press 1", and thereafter "Enter the name of the person to be searched". Similarly, the method may generate and provide a voice prompt such as "If you want to search for messages containing a particular phrase, press 2", and thereafter "Enter the phrase to be searched".

Once the matched messages are determined, a list of matching or corresponding messages may be compiled and presented to the user in any one of a number of ways. In an example embodiment, the messages may be presented sequentially, with the messaged being prefixed by caller identification. Thus, the method 100 may compile and generate a voice prompt such as "To retrieve messages from person A, press one and messages from person B, press two".

Alternatively, a voice navigational system may be provided using the TUI to enable the user to 'scroll' through the identified, matching messages and to select the desired message/s.

Figure 2:
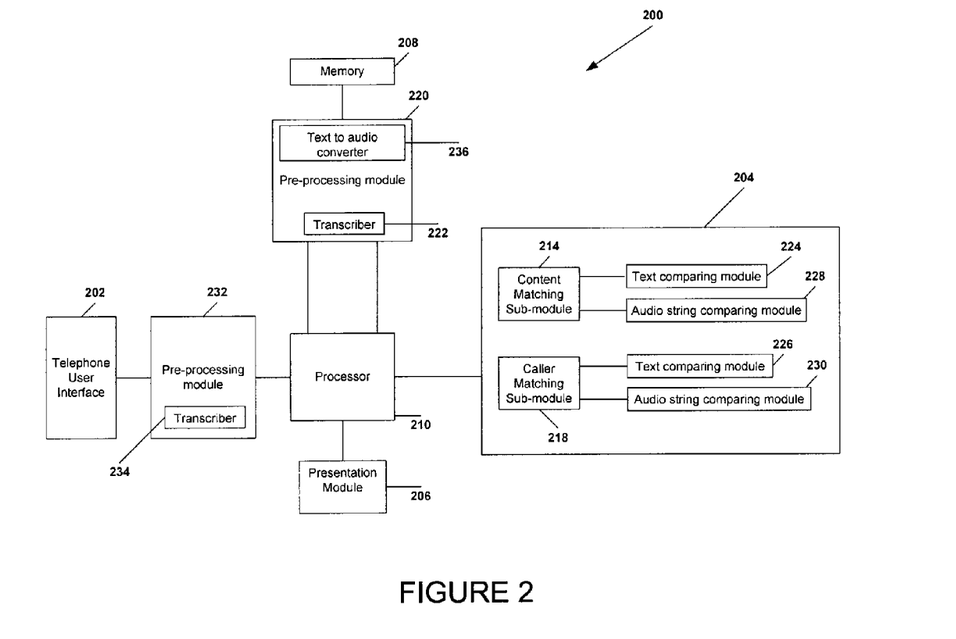
FIG. 2 shows a schematic diagram of a system, according to an example embodiment, to process and retrieve stored messages.

Turning now to FIG. 2, a system 200 allows a user to selectively retrieve at least one of a plurality of stored messages. The system 200 may comprise a telephone user interface (TUI) 202 to receive a voice command from a user, the voice command comprising at least one spoken search identifier. A matching module 204 may be provided to determine a message or messages that match or correspond to the spoken search identifier (or voice search term). The system 200 may further comprise a presentation module 206 to present the corresponding message or messages to the user.

The system 200 may comprise a memory 208, which may comprise a message database, to store the plurality of messages, and a processor 210 to control the system 200. As indicated above, the plurality of stored messages may comprise content data and caller data.

In an example embodiment, the spoken search identifier comprises a content identifier. The matching module 204 may comprise a content matching sub-module 214 to search the message database in the memory 208 utilizing the content identifier, and to determine the at least one stored message based on the content identifier.

In another example embodiment, the spoken search identifier comprises a caller identifier (e.g. a telephone number of the caller, a name of the caller, or the like). The matching module 204 may comprise a caller matching sub-module 218 to search the message database 208 utilizing the caller identifier, and to determine the at least one stored message based on the caller identifier.

In an example embodiment, the stored message may be a voice message. In this embodiment, the system 200 may further comprise a pre-processing module 220 that may in turn include a transcriber 222 to transcribe the stored voice message and the spoken search identifier to text. The matching module 204 may comprise text comparing modules 224 and 226, associated with the content matching sub-module 214 and the caller matching sub-module 218, respectively, that can compare the transcribed voice message to the transcribed spoken search identifier to determine the message or messages that match the spoken search identifier.

In another example embodiment in which the stored message may be a voice message, the matching module 204 may comprise audio string comparing modules 228 and 230, associated with the content matching sub-module 214 and the caller matching sub-module 218, respectively, that can compare the stored voice message to the spoken search identifier to determine the message or messages that match the spoken search identifier.

In a further example embodiment, the stored message is a text message. In this embodiment, the system 200 may comprise a pre-processing module 232 that may in turn comprise a transcriber 234 to transcribe the spoken search identifier, with the text comparing modules 224 and/or 226 being used to compare the stored text message to the transcribed spoken search identifier to determine the message or messages that include the spoken search identifier.

In another example embodiment in which the stored message may be a text message, the pre-processing module 220 may comprise a converter 236 for converting the stored text message to an audio string, with the audio string comparing modules 228 and/or 230 being used to compare the converted stored text message to the spoken search identifier to determine the message or messages that include the spoken search identifier.

Figure 3:
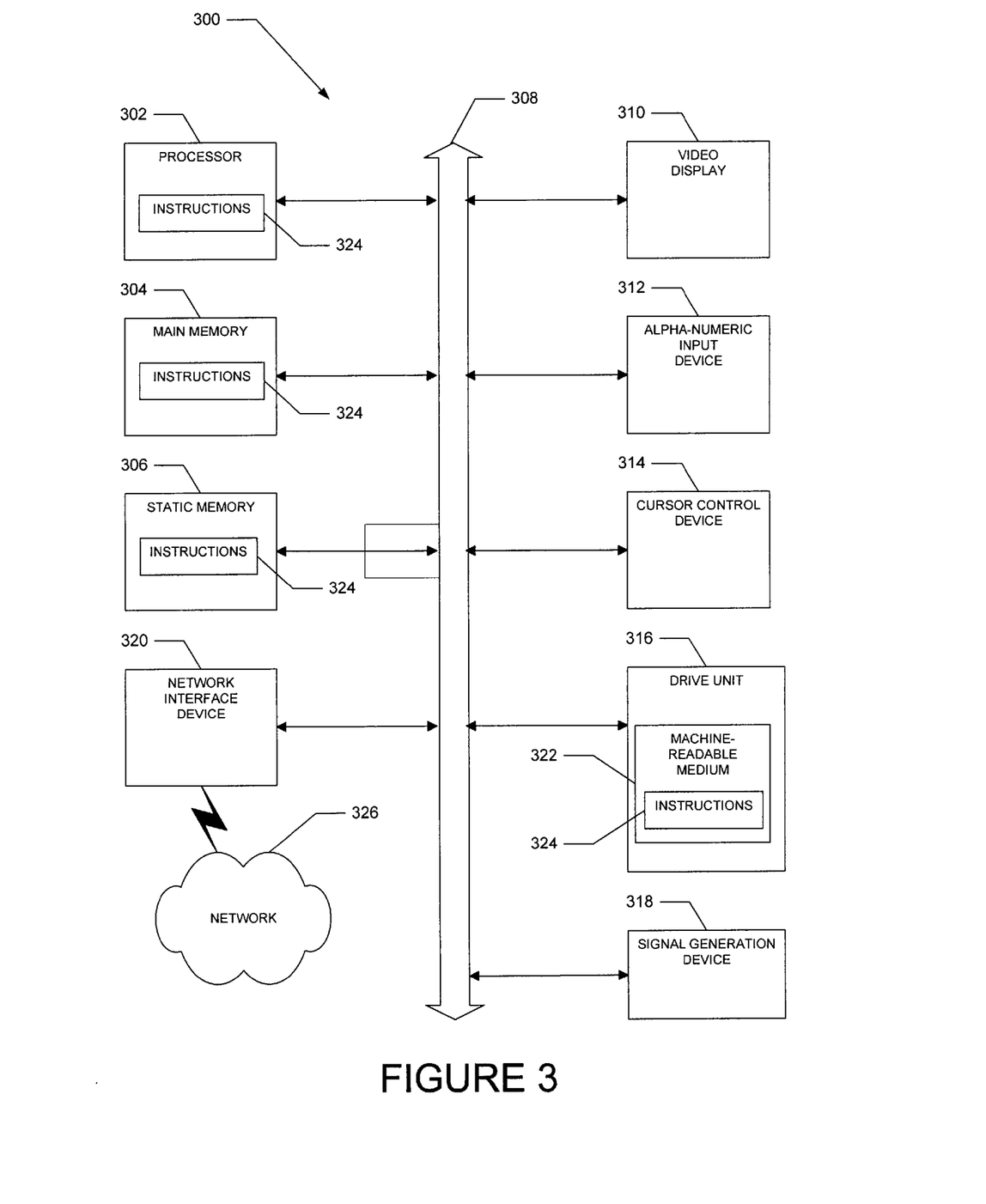
FIG. 3 shows a diagrammatic representation of machine in the example form of a computer system within which a set of instructions, for causing the machine to perform any one or more of the methodologies discussed herein, may be executed.

FIG. 3 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although the present application has been described with reference to specific example embodiments, it will be evident that various modifications and changes may be made to these embodiments without departing from the broader spirit and scope of the application. Accordingly, the specification and drawings are to be regarded in an illustrative rather than a restrictive sense.

The invention claimed is:

1. A method to selectively retrieve stored messages, the method comprising:
   receiving a voice communication from a user, the voice communication comprising at least one spoken search identifier;
   determining at least one stored message that corresponds to the spoken search identifier by searching the at least one stored message utilizing the spoken search identifier in an audio format, to determine the at least one stored message that corresponds to the spoken search identifier in an audio domain; and
   presenting the at least one stored message to the user.

2. The method of claim 1, wherein the at least one stored message comprises content data and caller data.

3. The method of claim 2, wherein the spoken search identifier comprises a content identifier, the determining of the at least one stored message comprises:
- searching the content data of the at least one stored message; and
- determining the at least one message based on the content identifier.

4. The method of claim 2, wherein the spoken search identifier comprises a caller identifier, the method comprises:
- searching the caller data of the at least one stored message; and
- determining the at least one message based on the caller identifier.

5. The method of claim 1, wherein the at least one stored message is a voice message.

6. The method of claim 1, wherein the stored message is a text message.

7. The method of claim 6, which comprises:
- converting the stored text message to an audio string; and
- comparing the converted stored text message to the spoken search identifier to determine the at least one message that includes the spoken search identifier.

8. A system to selectively retrieve stored messages, the system comprising:
- a telephone user interface to receive a voice communication from a user, the voice communication comprising at least one spoken search identifier;
- a matching module to determine at least one stored message that corresponds to the spoken search identifier, the matching module comprising an audio string comparing module to search the at least one stored voice message utilizing the spoken search identifier in an audio format to determine the at least one message that corresponds to the spoken search identifier in an audio domain; and
- a presentation module to present the at least one stored message to the user.

9. The system of claim 8, wherein the at least one stored message comprises content data and caller data.

10. The system of claim 9, wherein the spoken search identifier comprises a content identifier, with the matching module comprising a content matching sub-module to search the content data of the at least one message, and to determine the at least one stored message based on the content identifier.

11. The system of claim 9, wherein the spoken search identifier comprises a caller identifier, with the matching module comprising a caller matching sub-module to search the caller data of the at least one message, and to determine the at least one stored message based on the caller identifier.

12. The system of claim 8, wherein the at least one stored message is a voice message.

13. The system of claim 8, wherein the stored message is a text message.

14. The system of claim 13, which comprises a converter for converting the stored text message to an audio string, with the matching module comprising an audio string comparing module to compare the converted stored text message to the spoken search identifier to determine the at least one message that includes the spoken search identifier.

15. A system to selectively retrieve stored messages, the system comprising a processor to:
- receive a voice communication from a user, the voice communication comprising at least one spoken search identifier;
- determine at least one stored message that corresponds to the spoken search identifier, wherein the processor searches the at least one stored voice message utilizing the spoken search identifier in an audio format to determine the at least one stored message that corresponds to the spoken search identifier in an audio domain; and
- present the at least one stored message to the user.

16. The system of claim 15, wherein the at least one stored message comprises content data and caller data.

17. The system of claim 16, wherein the spoken search identifier comprises a content identifier, wherein the processor:
- searches the content data of the at least one stored message; and
- determines the at least one message based on the content identifier.

18. The system of claim 16, wherein the spoken search identifier comprises a caller identifier, wherein the processor:
- searches the caller data of the at least one stored message; and
- determines the at least one message based on the caller identifier.

19. The system of claim 15, wherein the at least one stored message is a voice message.

20. The system of claim 15, wherein the stored message is a text message.

21. The system of claim 20, wherein the processor:
- converts the stored text message to an audio string; and
- compares the converted stored text message to the spoken search identifier to determine the at least one message that includes the spoken search identifier.

22. A system to selectively retrieve stored messages, the system comprising:
- means for receiving a voice communication from a user, the voice communication comprising at least one spoken search identifier;
- means for determining at least one stored message that corresponds to the spoken search identifier by searching the at least one stored message utilizing the spoken search identifier in an audio format, to determine the at least one stored message that corresponds to the spoken search identifier in an audio domain; and
- means for presenting the at least one stored message to the user.

23. A computer-readable medium embodying instructions to retrieve stored messages, the instructions when executed by a machine cause the machine to:
- receive a voice communication from a user, the voice communication comprising at least one spoken search identifier;
- determine at least one stored message that corresponds to the spoken search identifier by searching the at least one stored message utilizing the spoken search identifier in an audio format, to determine the at least one stored message that corresponds to the spoken search identifier in an audio domain; and
- present the at least one stored message to the user.

* * * * *